(12) United States Patent
Plaza Baonza

(10) Patent No.: US 8,651,765 B2
(45) Date of Patent: Feb. 18, 2014

(54) RESTRAINT AND RELEASE DEVICE

(75) Inventor: Miguel Angel Plaza Baonza, Madrid (ES)

(73) Assignee: EADS CASA Espacio S.L., Madrid (ES)

( * ) Notice: Subject to any disclaimer, the term of this patent is extended or adjusted under 35 U.S.C. 154(b) by 236 days.

(21) Appl. No.: 12/887,365

(22) Filed: Sep. 21, 2010

(65) Prior Publication Data

US 2011/0113605 A1 May 19, 2011

(30) Foreign Application Priority Data

Sep. 22, 2009 (EP) .................................... 09382175

(51) Int. Cl.
*F16D 1/00* (2006.01)

(52) U.S. Cl.
USPC ........................................ 403/322.3; 411/434

(58) Field of Classification Search
USPC .......... 403/321, 322.1, 322.3, 21, 323, 359.3, 403/375, 380, 334; 244/173.1–173.3, 244/172.4, 172.5, 137.4, 131, 172.6; 411/434
See application file for complete search history.

(56) References Cited

U.S. PATENT DOCUMENTS

| | | | | |
|---|---|---|---|---|
| 3,531,145 | A * | 9/1970 | Hackman | 403/260 |
| 4,080,768 | A * | 3/1978 | Trixl | 52/521 |
| 4,431,333 | A | 2/1984 | Chandler | 403/322 |
| 4,854,798 | A * | 8/1989 | Snyder et al. | 411/434 |
| 5,005,786 | A * | 4/1991 | Okamoto et al. | 244/172.4 |
| 5,221,171 | A * | 6/1993 | Rudoy et al. | 411/433 |
| 5,248,233 | A * | 9/1993 | Webster | 411/433 |
| 5,312,152 | A | 5/1994 | Woebkenberg, Jr. et al. | 294/86.4 |
| 5,335,893 | A * | 8/1994 | Opp | 248/635 |
| 5,603,595 | A * | 2/1997 | Nygren, Jr. | 411/14.5 |
| 5,730,540 | A * | 3/1998 | Duran et al. | 403/21 |
| 6,095,736 | A * | 8/2000 | Miller et al. | 411/352 |
| 6,352,397 | B1 * | 3/2002 | O'Quinn et al. | 411/434 |
| 6,629,486 | B2 * | 10/2003 | Forys et al. | 89/1.14 |
| 6,767,155 | B2 * | 7/2004 | O'Brien et al. | 403/322.1 |
| 6,896,441 | B1 | 5/2005 | Champagne et al. | 403/326 |
| 6,939,073 | B1 * | 9/2005 | Ahmed et al. | 403/24 |
| 7,001,127 | B2 * | 2/2006 | Tuszynski | 411/433 |
| 7,328,879 | B1 * | 2/2008 | Plangetis | 248/679 |
| 7,862,282 | B2 * | 1/2011 | Smith et al. | 411/434 |
| 8,033,508 | B2 * | 10/2011 | Baumann et al. | 244/172.4 |
| 2008/0181748 | A1 * | 7/2008 | Rosemann et al. | 411/431 |
| 2008/0258577 | A1 | 10/2008 | Gotsmann et al. | 310/306 |

FOREIGN PATENT DOCUMENTS

| | | |
|---|---|---|
| JP | 2216398 A | 8/1990 |
| WO | 9967132 A1 | 12/1999 |

* cited by examiner

*Primary Examiner* — Joshua Kennedy
(74) *Attorney, Agent, or Firm* — Seed IP Law Group PLLC

(57) ABSTRACT

A device for the restraint and release of a deployable body mounted on a support structure, the device being operable between a stowed condition and a released condition, and having:
- a pair of subassemblies, each for being attached to either the deployable body or the support structure, these subassemblies having mating surfaces which interlock with one another in the stowed condition to substantially prevent lateral movement of the deployable body relative to the support structure;
- a releasable tensioned element which is connected to both of the subassemblies, exerting a compressive pre-load action on the said subassemblies that keep them together;
- a force measurement system that allows monitoring the cited compressive pre-load action applied;
- a releasing device for releasing the cited pre-load, allowing the free separation of the subassemblies;

further being provided with a tensioning mechanism embedded in the device such that it applies a substantially pure-tension pre-load to the releasable tensioned element.

20 Claims, 9 Drawing Sheets

RESTRAINT AND RELEASE DEVICE

FIELD OF THE INVENTION

The present invention is directed to the field of restraint and release devices and, more particularly, to an integrated restrain/release device suitable for use on space-based support structures.

BACKGROUND OF THE INVENTION

Separable or deployable bodies such as satellites or probes are carried on space launch vehicles for deployment in space. Equally, solar panel arrays, antennas, deployment booms, support members and the like are commonly carried on spacecrafts as separable bodies for deployment in space to perform special functions.

These bodies must be securely restrained during launching while stowed, and, in the case of the spacecraft's appendages, through delivery of the satellite into its operational orbit.

The bodies are released and deployed on board the carrier or support structure by actuating one or more restraint devices via remote control. Proper release and deployment of the bodies are critical to ensure that they are fully operational for their intended function. As failed deployment is generally not correctable, devices that are relied on for release and deployment functions need to be fail-safe for one-time use.

Secure restraint of stowed bodies is important to prevent movement of the bodies relative to the support structure. Restraint mechanisms are known that are interposed, in one or multiple locations, between the stowed bodies and their supporting structures to inhibit their relative movement. Known restraint mechanisms include, for example, mating cup and cone type elements and serrated plates attached to adjacent separable bodies.

Using multiple releasable restraint devices (RRDs) for restraining a body from different points at distant locations on it, is a widely used solution. It provides a very stable holding configuration regarding the body being tied and the location of its centre of mass. On the other hand, when representing a statically indeterminate (hyperstatic) constraint among bodies, this same multiple point restraining solution is subject to cause forces to be present during release, due to either assembly-induced loading, or to thermoelastic loading between body and support structure caused by differences in construction and/or temperature.

Typically, a RRD comprises a base and a bracket, each attached to either the deployable body or the support structure. As introduced before, these base and bracket have mating cup-cone surfaces which interlock with one another in the stowed condition to substantially prevent lateral movement of the bodies relative to each other. Restraining mechanisms apply, at installation, a compressive pre-load to the cup-cone arrangement, often through the brackets. For the release, a remotely activated release device releases the said preload, allowing for the free separation of cup and cone surfaces and, thus, of the mechanical link between deployable body and support structure.

Various types of release devices/mechanisms (RMs) for releasing restrained bodies from support structures are known. Known release devices include explosive and non-explosive actuating (NEA) mechanisms. The explosive actuated mechanisms pyrotechnically sever a pin, cable or bolt to release the stowed body.

Typically, during the release, due to the sudden relief of the strain energy coming from the applied preload, and/or to the pyrotechnical nature of the releasing device, and/or to the detention of ejected parts, a high level of shock is expected to be generated. This high shock causes undesirable effects; in particular, it can cause damage to sensitive elements of the payload inside the deployable body.

Several enhancements on pyrotechnical release devices have been made along the years by implementing in their constructions diverse techniques and means for shock reduction. Nevertheless, these techniques and means have not succeeded, in a universal way, to contain the shock emission level for these pyrotechnical devices comfortably below the requirements requested by the applications.

Conductive thermal isolation between the restrained body and the support structure, across the restraint system are, in a majority of cases highly desirable, because it allows independent (and, therefore, modular) thermal control treatment for both the deployable body and the support structure, with null or minimized conductive heat fluxes between them.

Low thermal conductance is, thus, typically preferred for a restraint/release device. This is typically not satisfied in the desired extent by the existing restraint/release devices, which appear penalised by an often used massive metallic construction (commonly in response to the important loading capability required).

Regarding accommodation and separable-body to support-structure integration and verification aspects, a restraint/release device having the following functionalities will also appear advantageous:

Compactness

Easiness of separable body integration onto support structure

The said pre-load sensing and tuning without the need of demounting the restraint and release system from the support structure The also said cancellation/minimisation of integration induced loads.

Known devices for restraining and releasing of deployable bodies on space vehicles are inadequate when judged in front of all the previously identified preferred characteristics. The known devices do not incorporate the said desirable features in its whole; they do not even comprise a significantly wide extent of them. Known devices commonly incorporate few of the said desirable features, being the others separately provided either by dedicated local solutions on the deployable body or/and of the support structure at their respective attachment locations to the HRS, or simply ignored.

Thus, there is a need for a device for restraint and release of deployable bodies such as satellites or probes from space launch vehicles support structures, or such as solar arrays, antennas booms and support members from spacecrafts support structures, that complement the characteristics present in the existing devices which occasionally:

i. securely restrain the body to any of these support structures from body stowage, throughout launch and/or cruise phases as appropriate;

ii. provide reliable release, being able to separate under loads;

iii. provide substantially permanent preload monitoring, available and accessible at anytime;

iv. exhibit robust strength and stiffness values in all three translational directions;

v. have reduced size and weight, with any new, new combination, or the whole of the following ones; so that additionally, the device, in an integrated construction:

vi. substantially cancels the rotational stiffness;

vii. is able to substantially cancel integration induced loading, by providing adjustment capability among interfaces, in order to compensate for dimensional imperfections;

viii. eases the integration of the deployable body onto the support structure, by staying compatible with simple and natural procedures, and prioritising the use of standard tools;

ix. allows applying/modifying the pre-load in substantially pure-tension conditions via a built-in tightening device;

x. comprises the said built-in pure-tension tightening device, which further allows pre-load corrections with the HRS assembled onto the separable body, the support structure, or both of them;

xi. releases with low shock; and xii. features low thermal conductance (conductive heat fluxes between the restrained body and the support structure, across the restraint system are minimized);

It can be obtained from study that new constructions of HRS systems satisfying these needs, even entirely, are feasible. The concepts and principles sustaining these new constructions represent the basis of the invention that is described next.

SUMMARY OF THE INVENTION

The invention discloses an integrated restraint and release device, also typically referred to as a Hold-down and Release System (HRS), suitable for use with deployable bodies preferably on a space-based support structure, such as a launch vehicle or spacecraft.

Thus, the invention relates to an integrated device for the restraint and release of a deployable body mounted on a support structure, this device being operable between a stowed condition and a released condition, transferring restraining force to a stowed body to substantially prevent movement of the body relative to the support structure, this device comprising:

a pair of differentiated parts or subassemblies, each for being attached to either the deployable body or the support structure. These two parts or subassemblies have mating, typically cup-cone, surfaces which interlock with one another in the stowed condition to substantially prevent lateral movement of the deployable body relative to the support structure;

a tensioned element, mechanically connected to both of the separable subassemblies, exerting a compressive action on the said subassemblies that keep them together; that applies, at installation, a compressive pre-load to the said cup-cone or similar arrangement. The geometry and friction coefficients of the interlocking mating surfaces of the subassemblies substantially prevent the tensioned element from working in shear, guaranteeing a solid holding condition when the device is pre-loaded, and a reliable separation following the release of the tensioned element;

an embedded or built-in force measurement system that allows monitoring of the pre-load of the tensioned element, this pre-load measurement system being of any kind, typically a mechanical or electromechanical transducer, embedded or built in the device. Preferably, the transducer substantially senses the pre-load in the tensioned element that is submitted to the whole of the pre-load, either in tension or compression;

a remotely activated releasing device for rapidly releasing the tensioned element, allowing for the free separation of the subassemblies and, thus, of the restraining constraint between the deployable body and the support structure. From the two differentiated separable subassemblies, the one from which the release is activated (i.e., the one where the releasing device is installed) is called active-assembly, whilst the other is referred to as passive-assembly.

A cared preload application should be favoured. A pure tensile application of the pre-load is the best way of guaranteeing that no excessive torsion has been applied to the release device during tightening, and also that no residual torsion is left after such operation. Precise knowledge of the magnitude of the applied preload is also of great interest, due to the relevance of this magnitude with regard to the capability of the restraint function and to the reliability of the release device operation.

Also, the capability for monitoring and/or eventually correcting the existing pre-load at anytime from pre-load installation to release operation is of great interest, especially as a mean for checking the correct status of the HRS prior to launch. Robustness and accessibility for the adopted pre-load measurement and/or variation system will always be considered as advantageous aspects and, therefore, desirable.

Regarding the desired said availability for these systems, built-in or embedded systems for tensioning and/or preload measurement, would be highly attractive.

The device also comprising, as improvements relating to the pre-load application, a tensioning mechanism able to apply a substantially pure-tension pre-load to the releasable tensioned element. The tensioning mechanism elongates the tensioned element by acting on the grip distance of the separable joint rather than (for the case of a threaded tensioned element) on the thread engagement. The said action on the overall thickness of the stack of compressed elements can be achieved by multiple means. Among others, elastic or thermal distortion, piezo-electric or magnetostrictive straining, and moving action mechanisms, are valid principles for the effective thickness variation of one or some of the compressed elements and, thus, of the whole stack elongating the tension element. The main advantage provided by this tensioning mechanism being based in that no accessibility to the threaded element in the known tensioning mechanism is needed, something which is very difficult to obtain in launch vehicles or spacecrafts. This tensioning mechanism is embedded or built-in in the integrated device of the invention, remaining available and accessible for being operated without requiring detachment of the cited integrated device from the support structure nor the separable body.

A preferred moving action mechanism solution for the tensioning mechanism is based in the wedge principle, applied by wedge-shaping an adjacent pair of the compressed parts, from which one of them can be externally actuated to slide sideways with respect to the other, making the overall thickness of both coupled wedges increase. The adequate implementation of this principle eases the pre-load application, due to its potential for big mechanical advantage (force ratio) that is associated with a big tensioning resolution and non-reversibility (which prevents for unintended pre-load loosening).

The device also provides further improvements relating to the reduction of emission of mechanical shock, by comprising any or any combination of the following techniques for reduction of the mechanical shock emission:

a) reduction of the mechanical shock introduced to the integrated device of the invention from the releasing device, by any of the following or any combination of the following:

allowing the releasing device to separate from its hosting device subassembly upon release of the tensioned element;

interposing different piece parts and/or material changes between the releasing device and the device interface for which the shock needs to be attenuated;

reducing the effective material section for mechanical shock transmission from the releasing device to the device of the invention;

b) reduction of the mechanical shock generated in the detention of the joining member after its release by the releasing device, by:

implementing shock absorbing means (e.g., collapsible or crushable materials) in the area where the released element impacts for detention;

interposing different piece parts and/or material changes between the said shock absorber and the device interface for which the shock needs to be attenuated;

reducing the effective material section for mechanical shock transmission from the said shock absorber to the device;

c) reduction of the mechanical shock generated by the release of the strain energy stored in the integrated device of the invention from the pre-load application, by:

containing the pre-load value to the necessary force to reliably perform the restraining function;

interposing different piece parts and/or material changes between the pre-load strained material or elements and the device interface for which the shock needs to be attenuated;

reducing the effective material section for mechanical shock transmission from pre-load strained material or elements to the integrated device.

Furthermore, the analysis of a multiple point restraining solution shows translational RRD stiffness values being of key relevance for the mechanical coupling of a body and its hosting support structure. In contrast, RRD rotational stiffness values are often undesirable because they can not significantly contribute to any better behaviour of the body-support structure composite. On the contrary, their presence causes interface moments interchange at every RRD that will unnecessarily stress all the linked parties (support structure, restrain devices, body) with the subsequent impact on performances, need for reinforcements or, at least, labour efforts to track them and their effects along the different implementation phases (e.g., engineering, assembly, testing, operation . . . ).

Thus, it is inferred that, for the majority of applications, a preferred multiple point restraining solution for a deployable body would be the one for which each individual restraint device better resembles an idealized spherical joint mechanical constraint (i.e., featuring the 3 translational degrees of freedom as constrained and the 3 rotational ones as free). This preferred articulated solution provides both of the desirable said advantages: (first) the tilt misalignment adjustment of the stowed body relative to the support structure and, (second) the preferred reduced hyperstaticity of the body to support structure restriction.

Therefore, over any resulting configuration from any individual or combined presence of the previously explained improvements, regarding the mechanical shock reduction or the pre-loading mechanism, a further additional improvement has been also foreseen within the scope of the invention. Such a further improvement consists in substantially adding a mechanical spherical articulation capability to the integrated device of the invention. The said capability guarantees: (i) tilt misalignment adjustment of the stowed body relative to the support structure at the moment of their mutual assembly through one or more integrated devices, and (ii) the preferred reduced hyperstaticity of body to support structure restriction, by substantially cancelling the moments exchange among them through each integrated device.

A preferred implementation of this improvement consists in the insertion of an additional swivelling bracket into the device that (i) is connected by a spherical articulation to it and (ii) accommodates the device characteristics for interfacing in mechanical connection with the separable body or support structure.

This preferred implementation also significantly contributes to the reduction of the device mechanical shock emission towards the body or structure to which the inserted swivelling bracket is connected. The facts that this swivelling bracket (i) does not accumulate any of the strain energy caused by the pre-load and (ii) is an added interposed part around the shock sources, makes this implementation merge with some of the shock reduction techniques previously explained as participant for this invention.

When the mating interlocking separable surfaces are of the kind, like for a cup-cone made of a pair of male-female mating conical surfaces, of those for which important contact stresses develop under bending moments, some embodiments of the current invention have foreseen alleviating techniques through a further use of the spherical articulation feature. For those cases, a further improved preferred implementation of the spherical articulation consists in the location of the articulation point, relative to the interlocking surfaces, so that the said contact stress levels are comfortable for the materials involved. Typically, this is satisfied when the articulation point approaches the centroid of the interlocking surface.

The construction of the spherical articulation can be of any kind. Some constructions use parts with mating sliding spherical surfaces like plain spherical bearings. Other constructions can be also considered, like those based on spherical ball or roller bearings; those based on cardan-type universal joints; or those based on flexible elements (e.g., radial beams) that, interposed between the two articulated pieces, allow, by flexing, for their relative movement for limited spherical articulation angular ranges.

A further additional improvement, also suitable for implementation over any combination of the previous ones, relates to the enhancement of the conductive thermal isolation properties for the integrated device. This further improvement comprises the interposition of one or more layers of low thermal conductance materials in the construction of the integrated device, between its attachment interfaces to the deployable body and support structure. Preferred implementations of this improvement consist in the adoption of low thermal conductance materials for at least one of the trybological layers across the device (typically, the mating interlocking separable surfaces of the subassemblies and/or the spherical surfaces of a plain spherical bearing); these inserted layers will, simultaneously, accomplish shock transmission reduction as explained previously.

Some other additional improvements are envisaged to be potentially present in any of the final constructions covered by this invention. These improvements are of modular implementation, each of them having the possibility of being added to the final construction of the integrated device with independence from the others. Said improvements are:

the added capability for offset distance correction among the mechanical connections with the separable body or support structure: one construction for this adjustability feature provides a stacking of laminated shimming at least in one of both connections; typically, the layers of laminated material can be peeled off to get the desired offset distance;

the added capability for integrated device separation status monitoring, by implementing sensors into the device that provide indication of the stowed or separated status of the integrated device: a preferred construction consists in the implementation of contact switches that, interposed between the separable subassemblies of the integrated device, change status upon separation. These sensors can be implemented as a single component, or, preferably, redundant, for improving the reliability of their feedback function.

the added capability of a separation initiation mechanism, typically known as a kick-off spring, for applying a short stroke separation force to the separable subassemblies of the integrated device in response to actuation of the releasing mechanism to urge the integrated device to the separated condition, overcoming any potential adhesion that might have developed between the mating interlocking subassemblies separable surfaces.

The integrated device of the invention provides the following advantages:

robust strength and stiffness values in all three restrained translational directions; possibility of cancelling the rotational stiffness (behaving as a spherical joint);

adjustable pre-load and a tilt adjustment for the connection;

ability to cancel integration induced loading, by providing adjustment capability among interfaces, in order to compensate dimensional imperfections;

low thermal conductance (conductive heat fluxes between the restrained body and the support structure, across the restraint system, are minimized);

easiness of deployable body integration onto the support structure, by staying compatible with simple and natural procedures, and prioritising the use of standard tools.

The deployable body can be of any kind. The support structure can be land, sea, air or space-based. The integrated device is particularly suitable for use on a space launch vehicle in combination with the satellite or probe being launched, or on a spacecraft in combination with other adjoined spacecraft or with appendages like a solar panel array, antenna, boom, support member or the like.

The two differentiated separable subassemblies can be referred as active-assembly and passive-assembly; the active-assembly being the one from which the release is activated (i.e., the one where the releasing device is installed). Typically, the active-assembly will be mechanically attached and electrically wired to the support structure system through which the integrated device will receive an electrical release command.

The geometry and friction coefficients for the interlocking mating surfaces substantially prevent the tensioned element from working in shear; guarantee a solid holding condition when the device is pre-loaded; and a reliable separation following the release of the tensioned element.

The tensioned element is mechanically connected to both of the separable subassemblies, exerting a compressive action on the said subassemblies that keeps them together; and being the connection to the active one via the releasing device.

The releasing device is preferably a separation nut assembly, either pyrotechnically or non-explosively actuated, compatible for releasable connection with the tensioned element (typically a bolt or bolt like member). The releasing device preferably provides rapid release of the tensioned element and, preferably, also low shock actuation, making the integrated device particularly suitable for the release of sensitive bodies.

To ensure complete separation of the tensioned element from the separation nut assembly, the device may comprise a separation bolt release assist mechanism. This assist mechanism can be an integrated feature of the releasing device (e.g., a ejector piston that pushes the released tensioned element out of the releasing device) or be provided separately by the integrated device (e.g., bolt a extractor spring that pulls the released tensioned element out of the releasing device).

In addition, a catcher mechanism is provided on the device for catching the tensioned element after it is released from the releasing device, to prevent bounce back of the said tensioned element.

The pre-load measurement system can be of any kind, typically a mechanical or electromechanical transducer, embedded or built in the integrated device. Preferably the transducer will be substantially sensing the pre-load in a member that is submitted to the whole of it, either in tension (e.g., the releasable bolt) or compression.

Other features and advantages of the present invention will be understood from the following detailed description of an illustrative embodiment of its object in relation to the attached figures.

DESCRIPTION OF THE DRAWINGS

These and other features, aspects and advantages of the present invention will become better understood from the following drawings, descriptions and appended claims, where:

DETAILED DESCRIPTION OF THE INVENTION

In the following description, the invention is set forth in the context of various embodiments for restraint and release devices especially suitable for use on space-based support structures, known as Hold-down and Release Systems (HRS), which are adapted for the restraint and selective release of deployable bodies on a space-based support structure (e.g., a spacecraft from a space launch vehicle, or a separable body from a spacecraft). It will be appreciated, however, that the invention is applicable in a variety of contexts where it is desired to maintain a deployable unit in a non-deployed state until a desired time and then allow for separation of the deployable unit from a support structure. Accordingly, it will be understood that the following embodiments are provided for purposes of illustration and the invention is not limited to any of such specific embodiments.

All embodiments that will be described from now on of this invention represent solutions, in which:

- The implementation of the claimed shock attenuation techniques has prioritised the reduction of mechanical shock emission to the passive-assembly. This responds to a typical application demand, where the active-assembly is attached to the support structure and the passive-assembly to a deployable body equipped with shock sensitive units;
- The mechanical connections to the support structure and the separable body are made by bolted joints; the bolting of both connections requiring only access from the support structure side;
- The releasing device has been represented as a pyrotechnically actuated separation nut, and, in coherence, the releasable tensioned element as a threaded bolt.

Figure 1A:
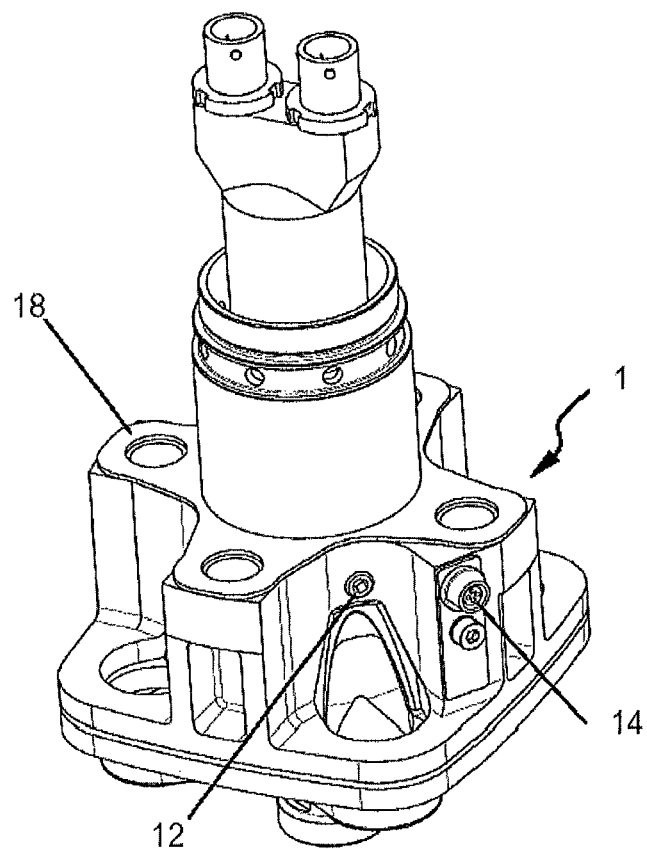
FIGS. 1a and 1b show assembled and separated perspective views, respectively, of a first embodiment of the restraint and release device according to the present invention.
Figure 1B:
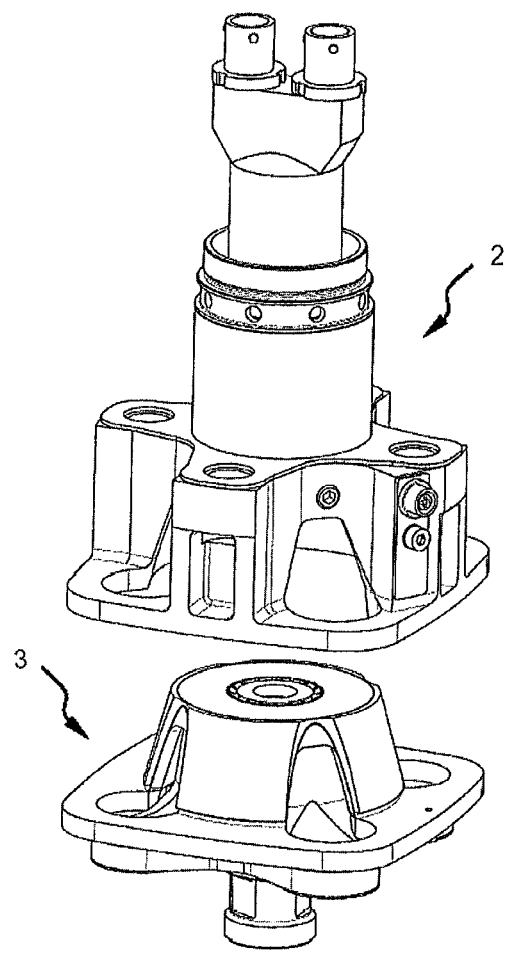
Figure 2A:
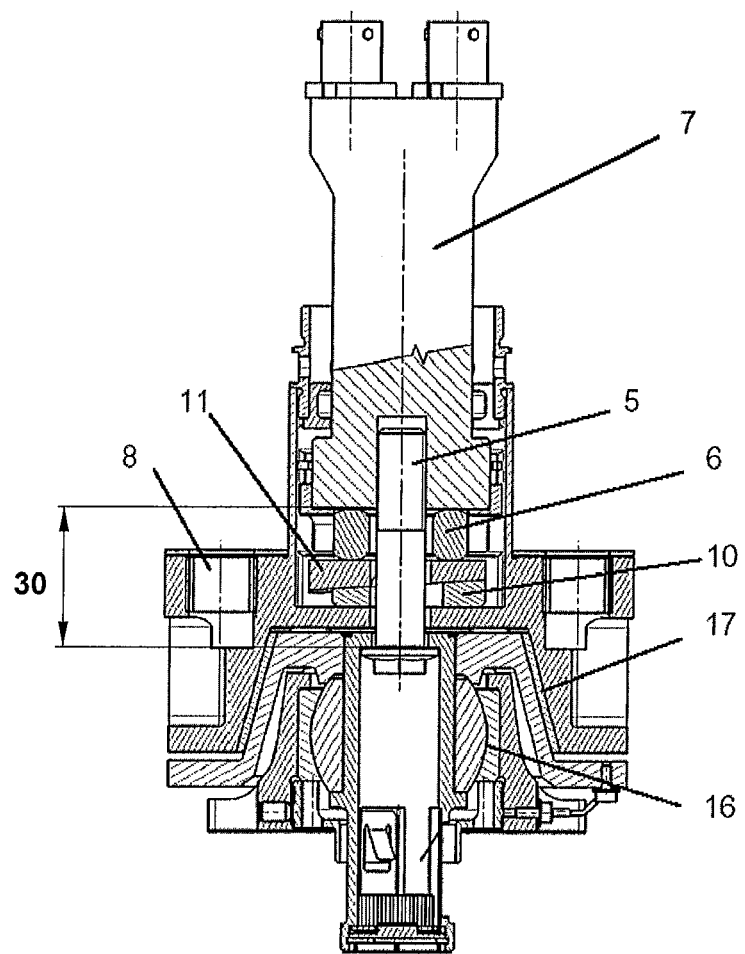
FIGS. 2a and 2b show cross sections of the first embodiment of the restraint and release device of FIGS. 1a and 1b, respectively, according to the present invention.
Figure 2B:
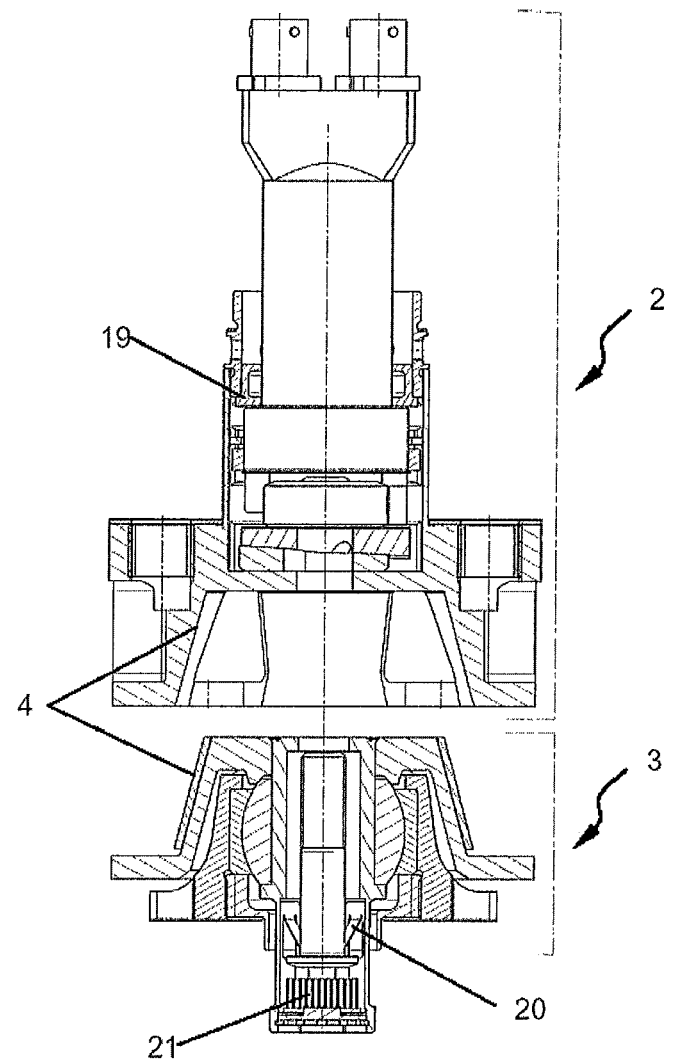
Figure 3:
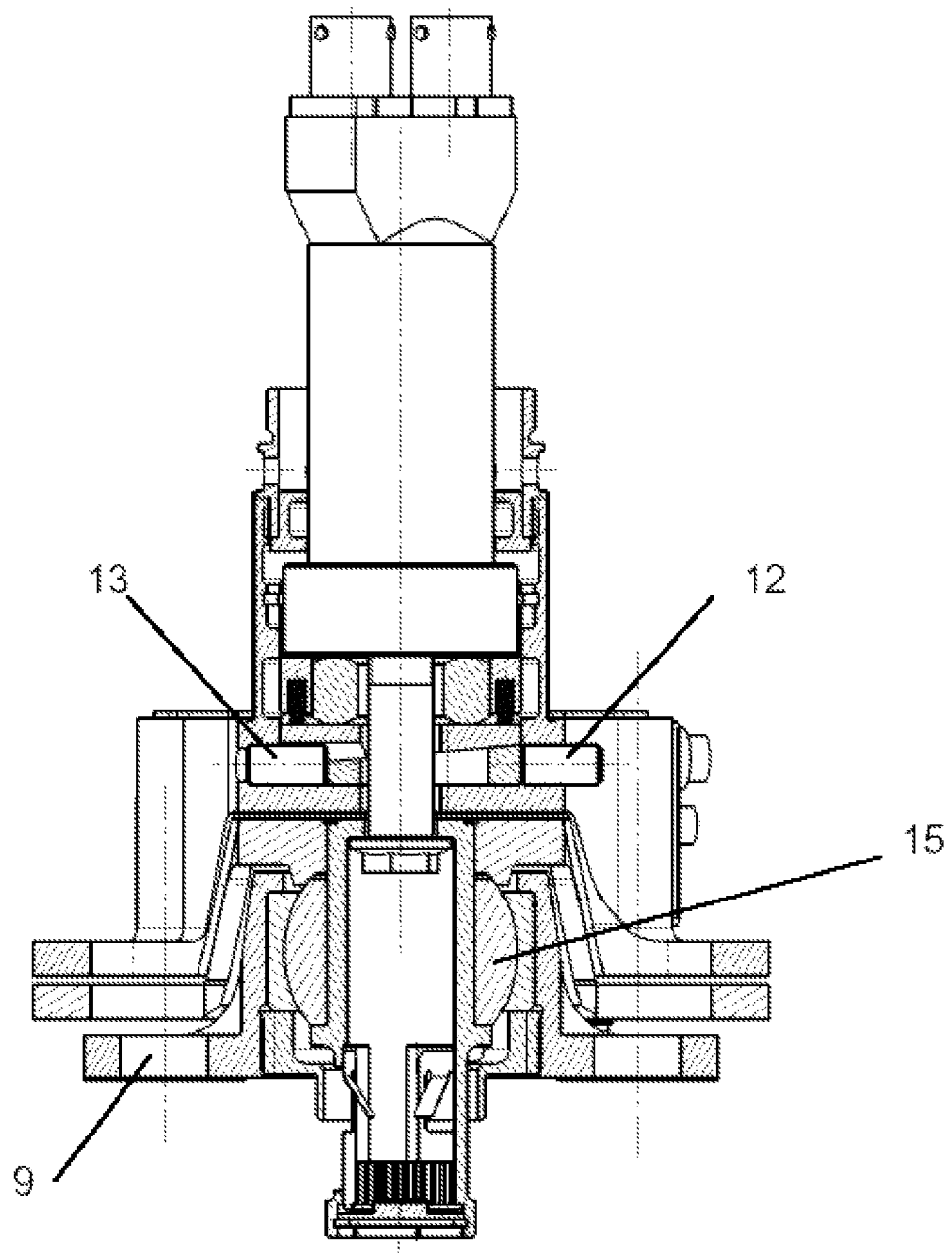
FIG. 3 is a further cross section of the first embodiment of the restraint and release device of FIG. 1a according to the present invention, across the mid-plane of the tensioning device.

One embodiment of the restraint and release device 1 (previously referred to as integrated device) of the invention is shown in FIGS. 1a, 1b, 2a, 2b and 3. The restraint and release device 1 comprises two differentiated separable subassemblies: an active-assembly 2 and a passive-assembly 3. In one embodiment, it is preferred that assemblies 2 and 3 have both conical mating surfaces 4 for completing a cup-cone arrangement in the stowed condition. This stowed assembled condition for the restraint and release device 1 is represented in FIGS. 1a, 2a and 3.

In one embodiment, the active-assembly 2 comprises four threaded holes 8 for attachment to the support structure. The passive-assembly comprises four holes 9, together with four bolts 5 to go through, for attachment to the deployable body.

A bolt 5 acts as tensioned element. Its head pulls the passive-assembly 3 against the active-assembly 2 with a pre-load that is also reacted at its threaded tip by engaging the releasing device 7, preferably a separation nut 7, installed into the active-assembly 2. To ensure complete separation of the bolt 5 from the separation nut assembly 7, this restraint and release device 1, in its first embodiment, relies on an ejector piston (not shown), available as an integrated feature in the state of the art for pyrotechnical separation nuts; the said piston axially pushes the bolt 5 out of the separation nut 7 upon release.

Upon separation nut 7 release and bolt 5 ejection, a catcher mechanism, here represented in the form of a set of flexible hooks 20, as shown in FIG. 2B, catches the head of the bolt 5 preventing it from bouncing back.

A ring-shaped compression load cell 6 is used as an embedded pre-load measurement system. It is installed under the separation nut 7, where it is submitted, in compression, to the entire-preload. The cited compression load cell 6 and the tensioning mechanism are implemented in the active-assembly 2 of the device 1.

A pre-load application mechanism is embedded into the restraint and release device 1 system. A wedge 10 seats onto another wedge 11 (see FIG. 2a); by acting on a set-screw 12, the lower wedge 10 can be forced to move horizontally, driving the upper wedge 11 further upwards, which causes the installed bolt 5 to elongate, increasing the pre-load of the restraint and release device 1 system. The low wedge angle makes the preload system non-reversible and its operation from the set-screw is comfortable and accurate. A second set-screw 13 allows for intentionally reversing the tensioning action, if needed. Thus, the tensioning mechanism elongates the tensioned element 5 (bolt) by acting on the overall thickness (30) over which the tensioning element 5 (bolt) acts, therefore providing an effective thickness variation over the compressed elements in the subassemblies 2, 3, which provides an effective variation in the elongation of the tensioned element 5 (bolt).

Availability and accessibility for pre-load monitoring and/or variation is provided by the permanent and accessible implementation of:

- an electrical connector 14 for the read-out of the load-cell 6; and
- the pre-load application set-screw 12.

The passive-assembly 3 has got permanent spherical tilting capability by the implementation of a plain spherical bearing 15. This spherical bearing 15 comprises a ball and a race-ring. In order to avoid ball to race-ring clearances, which can cause loss of rigidity or rattling of the restraint and release device 1 restraint function, they may be assembled together in a pre-stressed condition yet compatible with the articulation feature. The spherical bearing has been located relative to the conical mating surfaces 4 verifying that applied forces at its centre do not significantly develop high bending contact stresses on the said conical mating surfaces 4; in particular, by limiting the offset between the said centre and the centroid of the conical mating surfaces 4.

Stacked laminated shimming 18 provides adjustability for offset distance between mechanical connections to the support structure and the separable body. This complements the angular adjustability provided by the explained spherical tilting capability.

For obtaining an improved attenuation of the mechanical shock:

- The load-cell 6 and the stacked wedges 10 and 11 are interposed between the separation nut 7 and the restraint and release device 1 main housing of the active-assembly 2;
- The separation nut 7 is allowed to axially separate from the load-cell 6 in a backwards stroke. A stopping ring 19 preferably made of soft material allows low shock detention of the said stroke;
- A layer 17 preferably made of synthetic material is interposed at the separable conical mating surface 4;
- The spherical plain bearing mechanically splits the passive-assembly 3. All parts strained by the pre-load get isolated from direct contact with the mechanical connection to the shock-sensitive separable body. A further layer 16 preferably made of synthetic material is also interposed at the bearing surface;
- A pad 21 of shock absorbing material is provided for detention of the ejected released bolt 5. The pad 21 is installed at the end of a hollow shaft; this shaft is attached to the ball of the spherical plain bearing 15 for improved mechanical isolation from the restraint and release device 1 mechanical connections.

Moreover, the layers 16 and 17, preferably made of synthetic material, provide the restraint and release device 1 with a low thermal conductivity between its mechanical connections to the support structure and the separable body.

Figure 4:
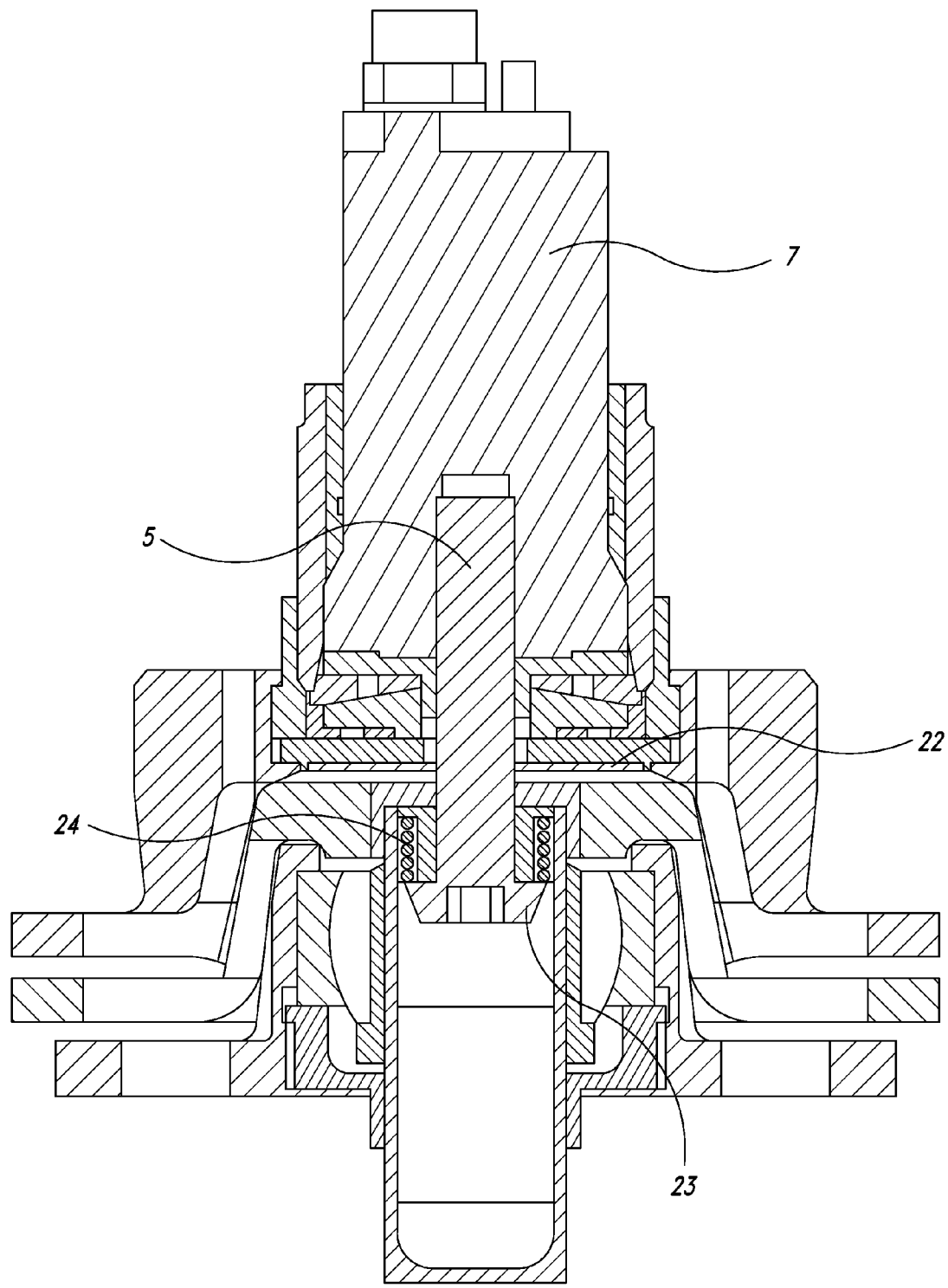
FIG. 4 is a cross section of a second embodiment of the restraint and release device according to the present invention.

A second embodiment, represented in FIG. 4, is a variation of the first embodiment shown in FIGS. 1a, 1b, 2a, 2b and 3, in which:

- A disc 22, put to work in flexion under the pre-load action, and sensed for strain through gauges, becomes the built-in pre-load measurement system;
- The preload application mechanism is based on the axial stroke that a radially-slotted conical washer 23 runs when seating on a conical surface and forced to shrink in diameter. The washer's shrinkage is forced by the displacement of a threaded collar 24 whose conical tip exerts a wedge action on the outer diameter of the washer;

An extractor spring 24 safely extracts the bolt 5 out of the separation nut 7 upon release. This implementation allows using separation nuts 7 lacking ejecting piston feature.

Figure 5:
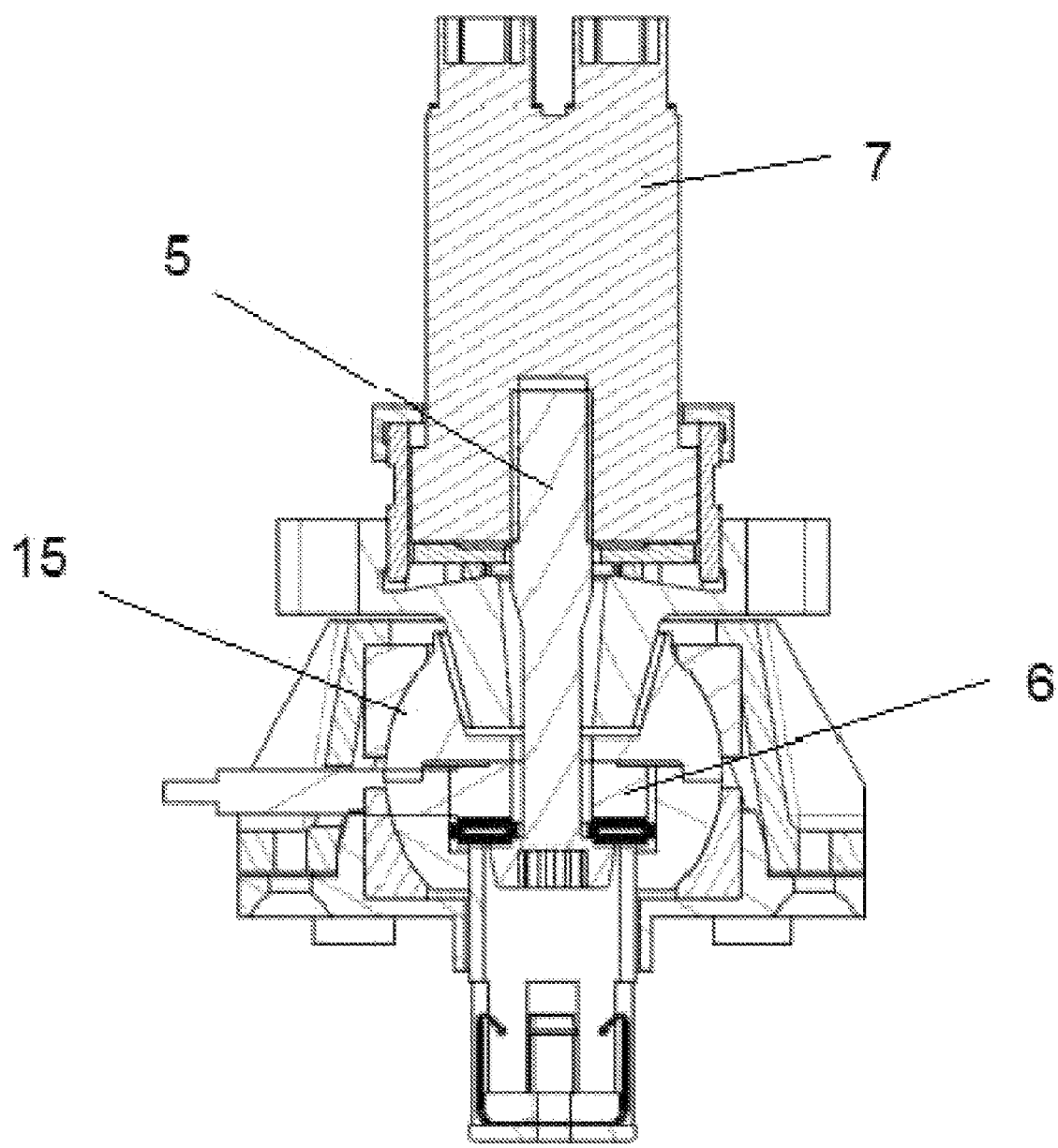
FIG. 5 is a cross section of a third embodiment of the restraint and release device according to the present invention.

Remarkable aspects for a third embodiment, shown in FIG. 5, are:

The cup-cone separation surface is internal to the sphere of the plain spherical bearing 15 (in contrast with the external configuration of the described first and second embodiments);

The pre-load measurement system comprises a load cell 6 working in compression under the head of the releasable bolt 5.

Figure 6A:
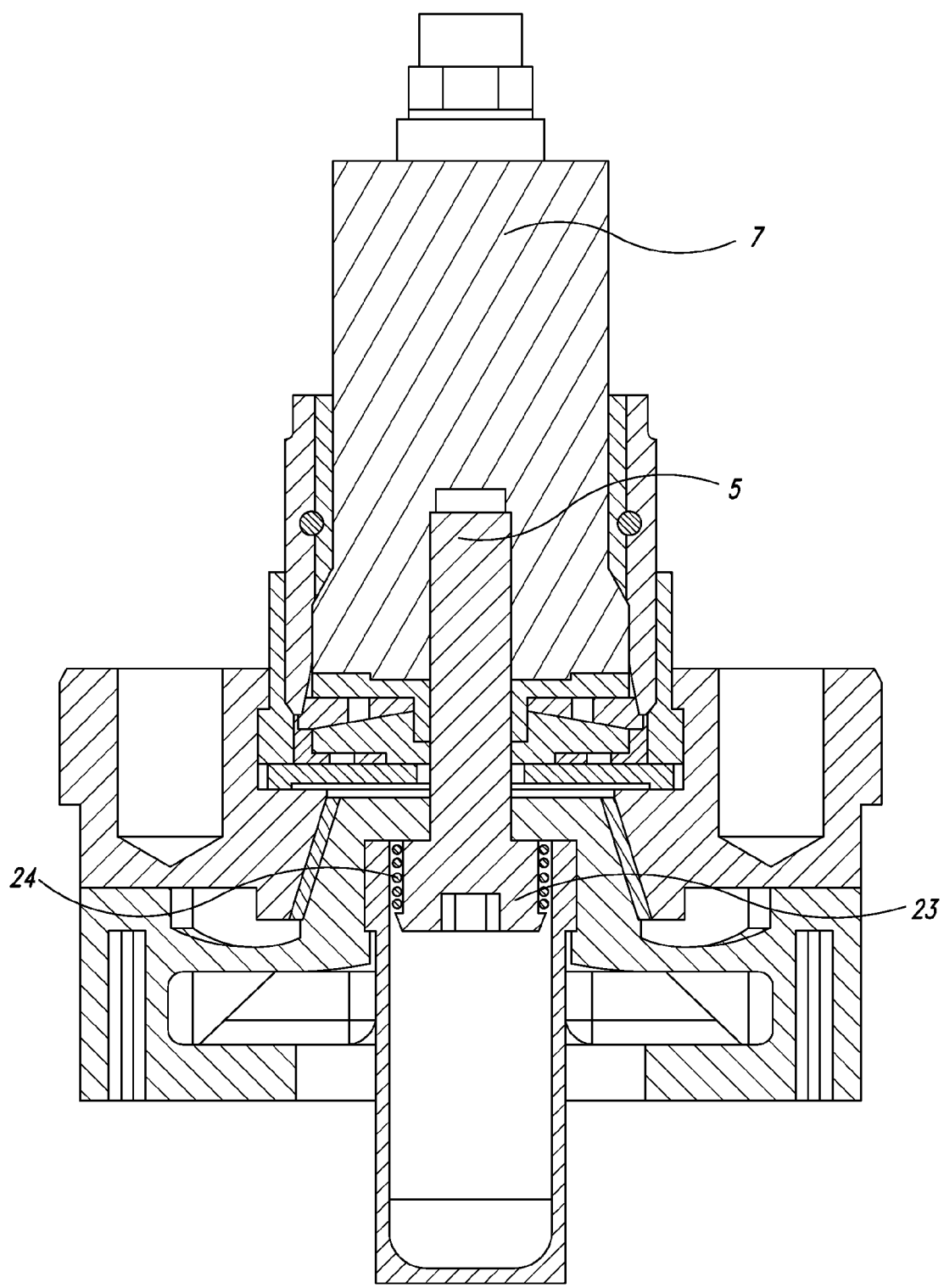
FIGS. 6a and 6b are assembled and separated cross sections, respectively, of a fourth embodiment of the restraint and release device according to the present invention.
Figure 6B:
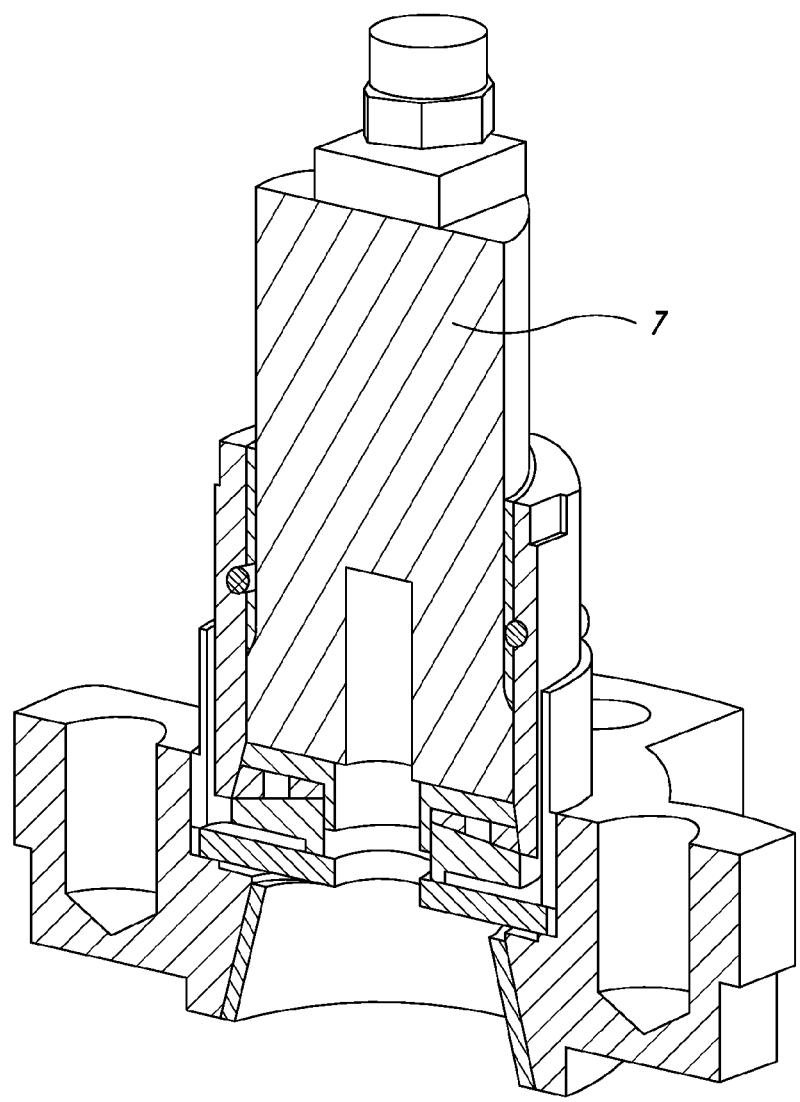
Figure 6B:
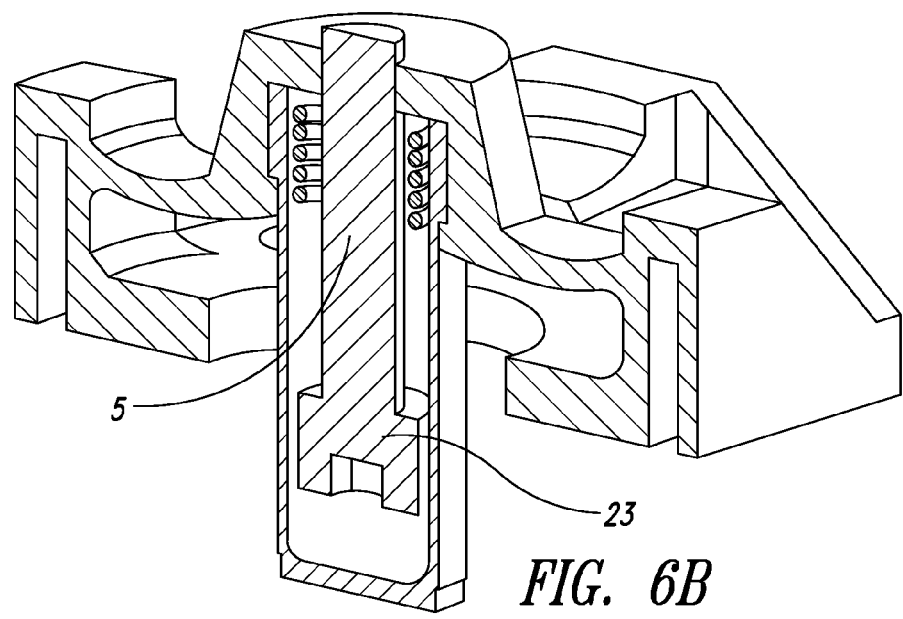

A fourth embodiment, represented in FIGS. 6a and 6b, represents a non-articulated variation of the second embodiment of FIG. 4.

While various embodiments and implementations of the present invention have been described in detail, it is apparent that further modifications and adaptations of the invention can occur. However, it is to be expressly understood that such modifications and adaptations are within the spirit and scope of the present invention.

Therefore, the modifications described within the scope defined by the following claims can be introduced in the embodiments which have just been described.

The invention claimed is:

1. A system for the restraint and release of a deployable body mounted on a support structure, the system being operable between a stowed condition and a released condition to selectively deploy the deployable body away from the support structure from a location remote from the system, the system comprising:

a pair of subassemblies comprising a passive subassembly and an active subassembly that separate from each other during deployment of the deployable body away from the support structure, the passive subassembly and the active subassembly each having a respective mounting arrangement for being fixedly attached to a respective one of the deployable body and the support structure such that the passive subassembly and the active subassembly move apart from each other when the deployable body is deployed away from the support structure, and the pair of subassemblies comprising mating surfaces which interlock with one another in the stowed condition to substantially prevent lateral movement of the deployable body relative to the support structure while enabling relative movement of the pair of subassemblies in a longitudinal direction when the deployable body is deployed away from the support structure;

a remote controlled releasing device operable by an electrical release command, which is coupled to the active subassembly to selectively release the active subassembly from the passive subassembly;

a releasable tensioned element coupling the remote controlled releasing device of the active subassembly to the passive subassembly, the releasable tensioned element exerting a pre-loaded compressive force between the active subassembly and the passive subassembly when the system is in the stowed condition to urge the mating surfaces together, and adapted to be released from the remote controlled releasing device upon remote controlled operation; and a tensioning mechanism coupled to at least one of the active subassembly and the passive subassembly, the tensioning mechanism being arranged to enable adjustment of a variable pre-load tension force of the releasable tensioned element while the system remains in the stowed condition.

2. A system for the restraint and release of a deployable body mounted on a support structure according to claim 1 wherein the tensioning mechanism is coupled to the releasable tensioned element and is adapted to elongate the releasable tensioned element in a controlled manner to adjust the variable pre-load tension force by at least one of elastic or thermal distortion, piezo-electric or magneto-strictive straining, and moving action mechanisms.

3. A system for the restraint and release of a deployable body mounted on a support structure according to claim 2 characterized in that the tensioning mechanism comprises an upper wedge that seats onto a lower wedge such that as the lower wedge is caused to translate horizontally it drives the upper wedge upwards, causing the tensioned element to elongate, increasing the variable pre-load tension force of the releasable tensioned element while the system remains in the stowed condition, the lower wedge having an angle such that the tensioning mechanism is non-reversible.

4. A system for the restraint and release of a deployable body mounted on a support structure according to claim 1, further comprising a force measurement transducer system coupled to the active subassembly and adapted to monitor the pre-loaded compressive force between the active subassembly and the passive subassembly when in the stowed condition.

5. A system for the restraint and release of a deployable body mounted on a support structure according to claim 1 further comprising:

a shock reduction device coupled to at least one of the active subassembly and the passive subassembly for the reduction of the mechanical shock emission generated by the system when the deployable body is released from the support structure, allowing the remote controlled releasing device to separate from the passive subassembly upon release of the tensioned element.

6. A system for the restraint and release of a deployable body mounted on a support structure according to claim 5, wherein the shock reduction device comprises a plurality of members interposed between the remote controlled releasing device and at least one of the mounting arrangements of the active subassembly and the passive subassembly for attenuating the shock.

7. A system for the restraint and release of a deployable body mounted on a support structure according to claim 5, wherein the shock reduction device is adapted to reduce the shock between the remote controlled releasing device and the pair of subassemblies when the deployable body is released.

8. A system for the restraint and release of a deployable body mounted on a support structure according to claim 5, wherein the shock reduction device comprises collapsible material and is positioned in an area in which the releasable tension element impacts upon release of the active subassembly from the passive subassembly.

9. A system for the restraint and release of a deployable body mounted on a support structure according to claim 1, further comprising an articulation mechanism coupled between the pair of subassemblies and having spherical surfaces, the articulation mechanism adapted to adjust tilt misalignment and to reduce hyperstaticity of the deployable body relative to the support structure.

10. A system for the restraint and release of a deployable body mounted on a support structure according to claim 9, wherein the articulation mechanism comprises a spherical bearing having a ball and a race-ring assembled together in a pre-stressed condition.

11. A system for the restraint and release of a deployable body mounted on a support structure according to claim 9, wherein the articulation mechanism comprises flexible elements interposed between the two articulated pieces of the device.

12. A system for the restraint and release of a deployable body mounted on a support structure according to claim 9, wherein a center of the articulation mechanism is substantially aligned with a centroid of the mating surfaces, such that forces applied at the center of the articulation mechanism do not significantly develop high bending contact stresses on the mating surfaces.

13. A system for the restraint and release of a deployable body mounted on a support structure according to claim 1, further comprising an articulation mechanism coupled between the pair of subassemblies and adapted to adjust tilt misalignment and to reduce hyperstaticity of the stowed body relative to the support structure, wherein the articulation mechanism is positioned either internally or externally with respect to the mating surfaces of the pair of subassemblies.

14. A system for the restraint and release of a deployable body mounted on a support structure according to claim 1, further comprising at least one layer of a low thermal conductance material in the construction of the system, between its attachment interfaces to the deployable body and support structure, thereby enhancing the conductive thermal isolation properties of the system.

15. A system for the restraint and release of a deployable body away from a support structure, the system comprising:
a passive subassembly;
an active subassembly that separates from the passive subassembly during deployment of the deployable body away from the support structure;
a remote controlled releasing device operable by an electrical release command, which is coupled to the active subassembly to selectively release the active subassembly from the passive subassembly;
a releasable tensioned element coupling the active subassembly to the passive subassembly, the releasable tensioned element adapted to exert a pre-loaded compressive force between the active subassembly and the passive subassembly when operating in a stowed condition, and adapted to be released from the remote controlled releasing device upon remote controlled operation; and
a tensioning mechanism coupled to at least one of the active subassembly and the passive subassembly, the tensioning mechanism being arranged to enable adjustment of a variable pre-load tension force of the releasable tensioned element while the system remains in the stowed condition.

16. The system according to claim 15 wherein the tensioning mechanism is coupled to the releasable tensioned element and is adapted to elongate the releasable tensioned element in a controlled manner to adjust the variable pre-load tension force by at least one of elastic or thermal distortion, piezoelectric or magneto-strictive straining, and moving action mechanisms.

17. The system according to claim 16 wherein the tensioning mechanism comprises an upper wedge that seats onto a lower wedge such that as the lower wedge is caused to translate horizontally it drives the upper wedge upwards, causing the tensioned element to elongate, increasing the variable pre-load tension force of the releasable tensioned element while the system remains in the stowed condition, the lower wedge having an angle such that the tensioning mechanism is non-reversible.

18. The system according to claim 15 further comprising a force measurement transducer system coupled to the active subassembly and adapted to monitor the pre-loaded compressive force between the active subassembly and the passive subassembly when in the stowed condition.

19. The system according to claim 15 further comprising an articulation mechanism coupled between the active subassembly and the passive subassembly and having spherical surfaces, the articulation mechanism adapted to adjust tilt misalignment and to reduce hyperstaticity of the deployable body relative to the support structure.

20. A system comprising:
a support structure;
a deployable body; and
a restraint and release device coupling the deployable body to the support structure, the restraint and release device being operable between a stowed condition and a released condition to selectively deploy the deployable body away for the support structure, and the restraint and release device comprising:
a pair of subassemblies comprising a passive subassembly and an active subassembly that separate from each other during deployment of the deployable body away from the support structure, the passive subassembly and the active subassembly each having a mounting arrangement for being fixedly attached to a respective one of the deployable body and the support structure such that the passive subassembly and the active subassembly move apart from each other when the deployable body is deployed away from the support structure, and the pair of subassemblies comprising mating surfaces which interlock with one another in the stowed condition to substantially prevent lateral movement of the deployable body relative to the support structure while enabling relative movement of the pair of subassemblies in a longitudinal direction when the deployable body is deployed away from the support structure;
a remote controlled releasing device coupled to the active subassembly to selectively release the active subassembly from the passive subassembly in response to an electrical release command;
a releasable tensioned element coupling the remote controlled releasing device of the active subassembly to the passive subassembly, the releasable tensioned element exerting a pre-loaded compressive force between the active subassembly and the passive subassembly when the restraint and release device is in the stowed condition to urge the mating surfaces together, and adapted to be released from the remote controlled releasing device upon remote controlled operation of the releasing device; and
a tensioning mechanism coupled to the active subassembly which is arranged to enable adjustment of a variable pre-load tension force of the releasable tensioned element while the restraint and release device remains is in the stowed condition.

* * * * *